(12) United States Patent
Hinata

(10) Patent No.: US 6,369,865 B2
(45) Date of Patent: *Apr. 9, 2002

(54) LIQUID CRYSTAL DISPLAY DEVICE WITH ELASTIC LAYER

(75) Inventor: Shoji Hinata, Matsumoto (JP)

(73) Assignee: Seiko Epson Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/117,022
(22) PCT Filed: Nov. 21, 1997
(86) PCT No.: PCT/JP97/04278
§ 371 Date: Jul. 20, 1998
§ 102(e) Date: Jul. 20, 1998
(87) PCT Pub. No.: WO98/22867
PCT Pub. Date: May 28, 1998

(30) Foreign Application Priority Data

Nov. 21, 1996 (JP) ............................... 8-311067
Dec. 26, 1996 (JP) ............................... 8-348168

(51) Int. Cl.$^7$ ............................... G02F 1/133
(52) U.S. Cl. ....................................... 349/12
(58) Field of Search ................... 345/173; 49/12, 49/127, 138

(56) References Cited

U.S. PATENT DOCUMENTS

| 4,785,564 A | * 11/1988 | Gurtler | 40/448 |
| 5,627,347 A | * 5/1997 | Kwon | 178/18 |
| 5,729,319 A | * 3/1998 | Inou et al. | 349/156 |
| 5,774,107 A | * 6/1998 | Inou | 345/104 |
| 5,831,702 A | * 11/1998 | Ito et al. | 349/12 |
| 5,835,080 A | * 11/1998 | Beeteson et al. | 345/173 |
| 5,852,487 A | * 12/1998 | Fujimori et al. | 349/162 |
| 5,867,241 A | * 2/1999 | Sampica et al. | 349/60 |

FOREIGN PATENT DOCUMENTS

| JP | 2-241798 | 9/1990 |
| JP | 5-303464 | 11/1993 |
| JP | 6-337411 | 12/1994 |
| JP | 7-28036 | 1/1995 |
| JP | 8-146392 | 6/1996 |

OTHER PUBLICATIONS

Partial translations of 6–337411, 7–28036, 8–146392, no date.*
Partial translations for Japanese Kokai #07–28036 and #08–146392.*

* cited by examiner

Primary Examiner—Kenneth Parker
(74) Attorney, Agent, or Firm—Harness, Dickey & Pierce, P.L.C.

(57) ABSTRACT

A liquid crystal (L) is sealed in a cell gap to be formed between a pair of transparent substrates (8a), (8b) to constitute a liquid crystal display device (2). Another plastic film (17b) of an input device (3) in which one plastic film (17a) is pressed by a pen (21), etc. under the instruction of the positional information is stacked on the liquid crystal display device (2) across a transparent elastic member (4), and a liquid crystal display device (1) is formed thereby. Both the descriptive durability and the input touch of a film-film type input device are improved at the same time. When the transparent substrates (8a),(8b) are formed of flexible material, the external force is prevented from being applied to the flexible transparent substrates (8a),(8b) easy to be locally deformed by absorbing the external force to be applied to the input device (3) by the transparent elastic member (4).

14 Claims, 6 Drawing Sheets

LIQUID CRYSTAL DISPLAY DEVICE WITH ELASTIC LAYER

TECHNICAL FIELD

The present invention relates to an input device to input the positional information. The present invention also relates to a liquid crystal display device which modulates the light by controlling the alignment of the liquid crystal and displays the visible information such as numerals, characters and patterns, and is provided with the above-mentioned input device. The present invention still further relates to the liquid crystal display device as mentioned above, in particular, of the type in which flexible transparent substrates such as plastic film are used as transparent substrates to hold the liquid crystal. The present invention is moreover concerned with an electronic device comprising such a liquid crystal display device.

BACKGROUND ART (1) Background Art Related to Input Device and Liquid Crystal Display Device Using it A CRT display is extensively used as a means to display the visible information in an electronic device such as a cash dispenser. A liquid crystal display device is extensively used as a means to display the visible information in electronic devices such as computer and electronic notebook. As a method to input various data in various electronic devices, an input method is known in which panel-shaped input devices are stacked on a visible information display device such as the CRT display and the liquid crystal display device, and the information is inputted by designating the position by pressing the desired position in the input panel of the input device by a pen or a finger when various visible information is displayed on the liquid crystal display device or the like. In performing the input method of this kind, the panel-shaped input devices are stacked directly on the liquid crystal display device, etc. in the conventional practice.

As the panel-shaped input device, a so-called film-glass type input device is conventionally known, in which a plastic film provided with an electrode terminal and a glass substrate provided with the electrode terminal are arranged opposite to each other with a clearance therebetween. In this input device, the positional information is inputted by usually pressing the plastic film side by a finger, etc. The so-called film-film type input device of the shape in which the substrate opposite to the plastic film on the input side comprises a plastic film is also known as the input device.

As a liquid crystal display device provided with the input device, a device in which an acrylic plate is arranged between a touch panel (i.e., an input device) and the liquid crystal display device is disclosed in the Japanese Unexamined Patent Publication No. 5-303464. In this conventional liquid crystal display device, the input device is prevented from being curved when the input device is pressed by a pen, etc., by providing the acrylic plate.

The above-mentioned film-glass type input device has a disadvantage that the glass is easy to break because a glass substrate is used on one side. On the contrary, the film-film type input device has an advantage that the input device is easy to handle because no film is broken. However, when the film-film type input device is directly stacked on the liquid crystal display device, etc., problems that the plastic film is degraded in a short time and damages such as cracking are easy to generate compared with the film-glass type input device if the input operation is repeated on the film-film type input device. A problem is further presented that the feeling during the input is not excellent because the stiff touch of the surface of the liquid crystal display device or the like is felt by an operator through the pen, etc. when the film-film type input device is directly installed on the liquid crystal display device, etc.

In the device disclosed in the Japanese Unexamined Publication No. 5-303464, i.e., the device provided with the acrylic plate between the liquid crystal display device and the touch panel, the above-mentioned problems are left unsolved that the plastic film of the input device is easy to degrade, and the input feeling is not excellent because the acrylic plate is made of hard material.

(2) Background Art Related to Liquid Crystal Display Device of the Structure Using Flexible Transparent Substrate Such as Plastic Film In recent years, the liquid crystal display device is extensively used as a means to display the visible information in electronic devices such as computers and electronic notebooks. In the liquid crystal display device, a liquid crystal panel (i.e., the liquid crystal display device) is generally formed by sealing the liquid crystal in the clearance, the so-called cell gap, to be formed between a pair of transparent substrates, an IC for driving the liquid crystal is connected to the liquid crystal panel, and accessories such as a back light and a casing are further mounted on the liquid crystal panel.

A pair of above-mentioned transparent substrates are formed of the material difficult to deflect such as glass in some cases, or formed of the flexible material such as a plastic film in other cases. The transparent substrates formed of the plastic film have many advantages such as difficulty to crack, formation in thin structure, light weight, and formation in various shapes.

However, in the liquid crystal display device in which the flexible material such as plastic film is used, if the plastic film is poorly handled in building it in an electronic notebook or other electronic devices, abnormal external force is applied to the liquid crystal display device, problems are presented that a local recessed part is generated in the transparent substrate, and as a result, defective appearance by irregular color is generated, defective appearance such as dark dots caused by bubbles in the liquid crystal is generated, or cracks are generated in a transparent electrode. Cracks generated in the transparent electrode may lead to not only disconnection of wires, but also defective display, causing a problem.

Even after build-in of the liquid crystal display device in the electronic device is completed, the above-mentioned problems such as generation of irregular color, bubbles, etc. are presented if the local external force is applied to the transparent substrate of the liquid crystal display device by some reasons.

(3) Object of the Present Invention

The first object of the present invention is to solve problems related to the above-mentioned input device, and more specifically, in the film-film type input device and various devices using it, to prevent degradation of the plastic film in a short time, i.e., to improve the descriptive durability on the input device and to improve the inputting touch related to the input device.

The second object of the present invention is to solve the problems related to the liquid crystal display device of the structure using the above-mentioned flexible transparent substrate, and more specifically, to prevent generation of the irregular color on the display screen of the liquid crystal display device or generation of bubbles in the liquid crystal by mitigating the external force when the external force is applied to the liquid crystal display device using the flexible transparent substrate.

DISCLOSURE OF INVENTION (1) To achieve the first object mentioned above, the input device related to the present invention is an input device in which a pair of plastic films stacked on each other with clearance are provided, one plastic film is pressed to display the positional information, and the other plastic film is stacked on the visible information display means. The input device is characterized in that a transparent elastic member is provided on the surface of the plastic film stacked on the visible information display means.

In the input device, the transparent elastic member is arranged on the outer side of the plastic film on the opposite side to the plastic film on the side to be pressed by a pen, etc., related to the film-film type input device, and concentration of the stress to be applied to the plastic films on both face and back sides when one plastic film is pressed by the pen, etc. in a small area can be avoided, and thus, degradation of the plastic film in a short time can be prevented. That means, the descriptive durability of the input device can be improved.

When one plastic film is pressed by the pen, etc., the transparent elastic member is elastically deformed according thereto, and soft and favorable touch can be obtained compared with the case where hard material such as glass is pressed by the pen, etc. That means, the input touch of the input device is improved.

In the input device of the above-mentioned constitution, the visible information display means includes the liquid crystal display device to display the visible information such as numerals, characters and patterns by controlling the alignment of the liquid crystal to modulate the light, and the CRT display to display the visible information using the CRT (Cathode Ray Tube).

(2) In the input device according to (1) above, the transparent elastic member such as silicone rubber and acrylic rubber can be used.

(3) In the input device according to (1) above, the thickness of the transparent elastic member is preferably not less than 0.5 mm to less than 2 mm. If the thickness is below 0.5 mm, neither of improvement of the descriptive durability nor improvement of the input touch can be obtained. If the thickness exceeds 2 mm, the clearance between the screen of the liquid crystal display device, etc., and the pressing point by the pen, etc., becomes excessive, and alignment of the desired point to be pressed in the screen with the actual pressing point may be unsuccessful. In particular, the problem will be presented remarkably when the pressing operation is performed watching the screen in the diagonal direction.

(4) In the input device according to (1) above, the Young's modulus of the transparent elastic member is preferably not less than $1 \times 10^4$ N/m$^2$ to less than $1 \times 10^8$ N/m$^2$. The Young's modulus of natural rubber is $9.0 \times 10^6$ N/m$^2$, and the Young's modulus of silicone rubber is $7.0 \times 10^6$ N/m$^2$ respectively, and these elastic materials are especially preferable.

(5) Next, to achieve the first object mentioned above, the liquid crystal display device related to the present invention is provided with a liquid crystal display means and an input means. The liquid crystal display means is provided-with a pair of transparent substrates which are opposite to each other forming a cell gap therebetween, and a liquid crystal sealed in the cell gap. In addition, the input means is provided with a pair of plastic films stacked on each other with clearance. One plastic film is pressed to display the positional information while the other plastic film is stacked on the above-mentioned liquid crystal display means. The liquid crystal display device is characterized in that the transparent elastic member is provided between the above-mentioned liquid crystal display means and the above-mentioned input means.

(6) In the liquid crystal display device according to (5) above, the transparent elastic member such as silicone rubber and acrylic rubber can be used.

(7) In the liquid crystal display device according to (5) above, the thickness of the transparent elastic member is preferably not less than 0.5 mm to less than 2 mm.

(8) In the liquid crystal display device according to (5) above, the Young's modulus of the transparent elastic member is preferably not less than $1 \times 10^4$ N/m$^2$ to less than $1 \times 10^8$ N/m$^2$. The Young's modulus of natural rubber is $9.0 \times 10^6$ N/m$^2$, and the Young's modulus of silicone rubber is $7.0 \times 10^6$ N/m$^2$ respectively, and these elastic materials are especially preferable.

(9) Next, to achieve the first object mentioned above, the electronic device related to the present invention includes the display device to display the visible information such as a computer, an electronic notebook, and a cash dispenser, e.g., the liquid crystal display device and the CRT display. The electronic device related to the present invention is characterized in that the liquid crystal display device including the constitution that the transparent elastic member is provided between the liquid crystal display means and the input means, is included as the constitution requirement.

(10) To achieve the second object mentioned above, the liquid crystal display device related to the present invention is characterized in that the transparent elastic member which is arranged on the outer side of one flexible transparent substrate and uniformly covers the flexible transparent substrate, and a transparent covering member which is arranged on the outer side of the transparent elastic member and uniformly covers the transparent covering member are provided in the liquid crystal display device having a pair of flexible transparent substrates opposite to each other so as to form the cell gap and the liquid crystal sealed in the cell gap.

In the liquid crystal display device, even when the external force is applied to the transparent covering member, the external force is absorbed by the transparent elastic member, and the external force is little transmitted to the flexible transparent substrate of the liquid crystal panel, and no local focus is applied to the flexible transparent substrate. As a result, generation of the irregular color of the displayed image and bubbles in the liquid crystal can be prevented.

In the above-mentioned constitution, the "flexible transparent substrate" of the liquid crystal panel can be formed, e.g., of the plastic film of polycarbonate (PC), polyacrylate (PAr) and polyether sulfone (PES).

(11) In the liquid crystal display device according to (10) above, the transparent covering member is preferably lower in elasticity than the transparent elastic member, i.e., large in Young's modulus.

(12) In the liquid crystal display device according to (10) above, the "transparent covering member" is a member provided on the outer side of the liquid crystal panel for the purpose of playing various roles, and comprises a protective plate to protect e.g., the flexible transparent substrate of the liquid crystal panel.

(13) The "transparent covering member" can be constituted by the input device to input the information such as numerals and characters. The input device includes e.g., a pair of transparent substrates stacked on each other with clearance, one of which is pressed to display the positional information, the other of which is arranged on the outer side of the liquid crystal panel so as to uniformly cover the flexible transparent substrate of the liquid crystal panel. The transparent substrate of the input device may be formed using the flexible material such as the plastic film, or may be formed using the non-flexible material such as glass.

(14) The "transparent covering member" can be constituted by a polarizer. In this case, the transparent elastic member is arranged in contact with the outer side of the flexible transparent substrate, and the polarizer is arranged on the outer side of the transparent elastic member.

(15) In the liquid crystal display device according to (10) above, the transparent elastic member can be formed of e.g., silicone rubber.

(16) In the liquid crystal display device according to (10) above, the thickness of the transparent elastic member is preferably not less than 0.5 mm to less than 2 mm. When the thickness is less than 0.5 mm, the effect to mitigate the external force becomes insufficient, while if the thickness is not less than 2 mm, handling becomes difficult, or the appearance can be damaged. In particular, when the transparent covering member to be arranged on the outer side of the transparent elastic member is the input device, and the thickness of the transparent elastic member is not less than 2 mm in thickness, the clearance between the screen of the liquid crystal panel and the pen input pressing point of the input device becomes excessive to make it difficult to perform the input work.

(17) In the liquid crystal display device according to (10) above, the Young's modulus of the transparent elastic member is preferably not less than $1\times10^4$ N/m$^2$ to less than $1\times10^8$ N/m$^2$. The Young's modulus of the above-mentioned silicone rubber is $7.0\times10^6$ N/m$^2$, which is particularly preferable.

(18) Next, to achieve the second object mentioned above, the electronic device related to the present invention is characterized in that the electronic device is an arbitrary device to use the liquid crystal display device as the display device to display the visible information such as a computer and an electronic notebook, the liquid crystal display device includes a pair of flexible transparent substrates to seal the liquid crystal, the transparent elastic member is arranged on one outer side of the flexible transparent substrates, and the transparent covering member such as the protective plate and the input device is arranged on the outer side of the transparent elastic member.

BRIEF DESCRIPTION OF DRAWINGS

BEST MODE FOR CARRYING OUT THE INVENTION (A) First Embodiment Related to the Input Device Described in (1) Above and the Liquid Crystal Display Device Described in (5) Above FIG. 2 illustrates one embodiment of a liquid crystal display device of the present invention described in (5) above. The liquid crystal display device 1 is provided with a liquid crystal display device 2, an input device 3, and a transparent elastic member 4 to be arranged between the devices. The transparent elastic member 4 is made of, e.g., silicone rubber, acrylic rubber, etc., to the thickness of not less than 0.5 mm to less than 2 mm. The Young's modulus of silicone rubber is approximately $7.0\times10^6$ N/m$^2$. Silicone rubber can generally be formed by mixing two necessary liquid materials.

Concerning the method in which silicone rubber is arranged as the transparent elastic member 4 between the liquid crystal display device 2 and the input device 3, a method can be adopted in which a silicone rubber is placed on either surface of the liquid crystal display device 2 or the input device 3, and then, another device is stacked on the silicone rubber. In this case, the silicone rubber 4 may be adhered to the liquid crystal display device 2, and the silicone rubber 4 may be adhered to the input device 3 using appropriate adhesive, or the space between the silicone rubber and the liquid crystal display device and the space between the silicone rubber and the input device may be in the adhered condition only by the adhesivity of the silicone rubber itself.

Figure 1:
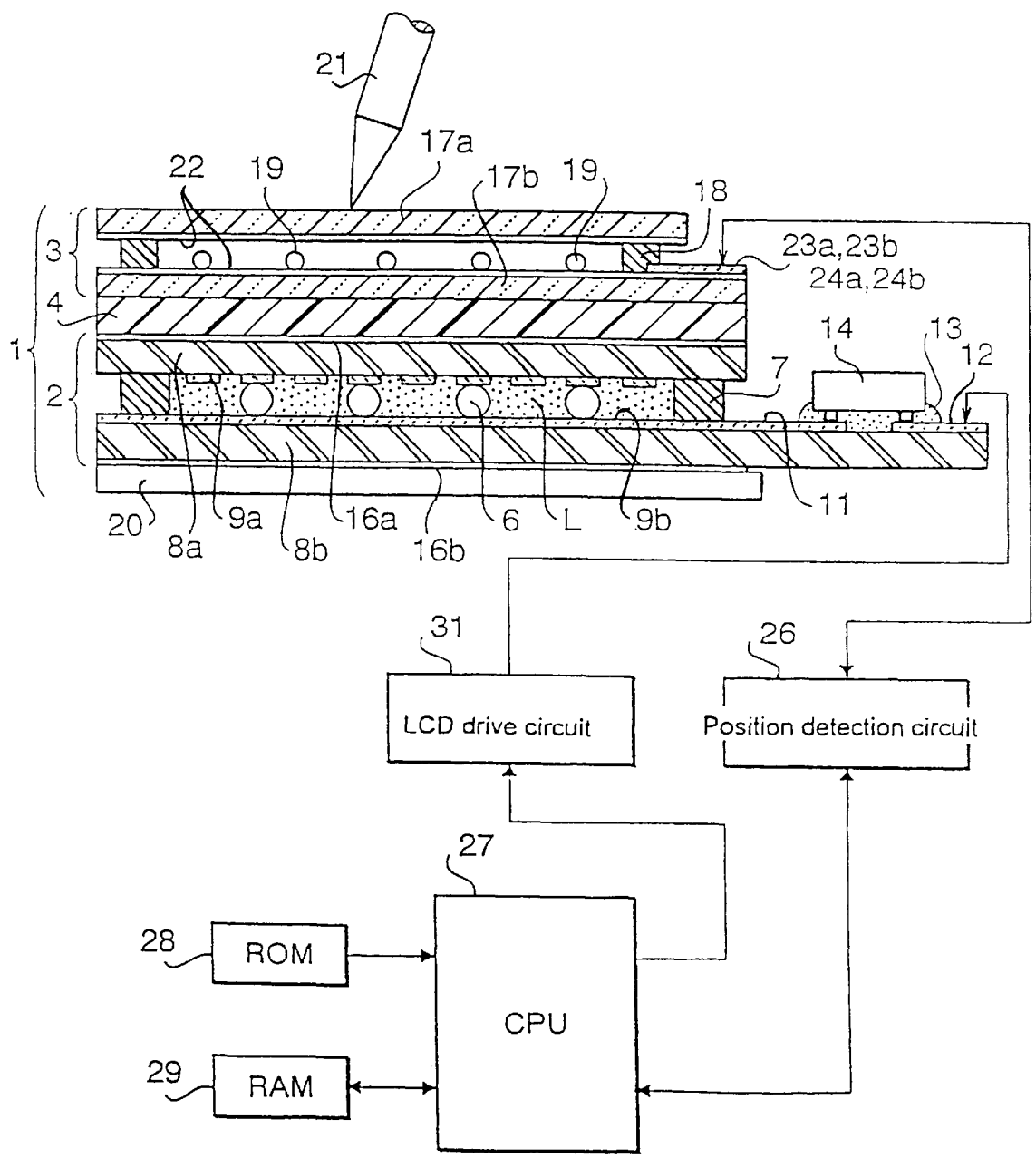
FIG. 1 is a sectional view illustrating an input device of the present invention and an embodiment of the liquid crystal display device using it.

The liquid crystal display device 2 is provided with a pair of glass transparent substrates 8a, 8b to be bonded with each other with a sealant 7 across a spacer 6, and a liquid crystal L to be sealed in a cell gap formed between the substrates as illustrated in FIG. 1. A first transparent electrode 9a made of ITO (Indium Tin Oxide) is formed on an inner surface of a first transparent substrate 8a, and a second transparent electrode 9b is formed on an inner surface of the second transparent substrate 8b. A polarizer 16a is adhered to an outer surface of the first transparent substrate 8a, and a polarizer 16b is adhered to an outer surface of the second transparent substrate 8b. The polarization axes of the polarizers are opposite to each other with the prescribed angle to obtain the polarizing transmittance necessary for displaying the visible information. A back light unit 20 is arranged on the further outer side of the polarizer 16b.

The first transparent electrode 9a and the second transparent electrode 9b are connected to an electrode terminal 11 formed on an extension part of the second transparent substrate 8b. A terminal 12 for external connection is formed on an edge part of the extension part of the second transparent substrate 8b. A bump for output and a bump for input of an IC 14 for driving the liquid crystal are respectively and conductive-connected to the terminals 11,12 by an ACF 13 (Anisotropic Conductive Film). That means, in the present embodiment, a liquid crystal panel of the type where the IC 14 for driving the liquid crystal is directly bonded on the transparent substrate of the liquid crystal panel, i.e., a so-called COG (Chip On Glass) type, is used.

The transparent elastic member 4 is loaded on the surface of the polarizer 16a on the first transparent substrate 8a, and the input device 3 is further loaded on the transparent elastic member 4. The input device is consisted as a so-called film-film type input device, and more specifically, contains a first plastic film 17a and a second plastic film 17b. The films are formed of, e.g., polyether sulfone (PES), polycarbonate (PC), acryl, polyacrylate, polyhydroxy polyether, etc.

A transparent electrode 22 of ITO is formed on the whole inner surface of the films 17a,17b. The films are bonded with each other by the sealant 18, and opposite to each other with appropriate clearance therebetween. A plurality of spacers 19 are dispersed in the clearance. When the position is specified, the desired position on the first plastic film 17a is pressed by a pen 21, etc. Though there is a small clearance between the spacer 19 and the first plastic film 17a, the transparent electrode of the first plastic film 17a of the pressed part is deformed when the first plastic film 17a is pressed by the pen 21, etc., and brought into point contact with the transparent electrode of the second plastic film 17b.

Figure 3:
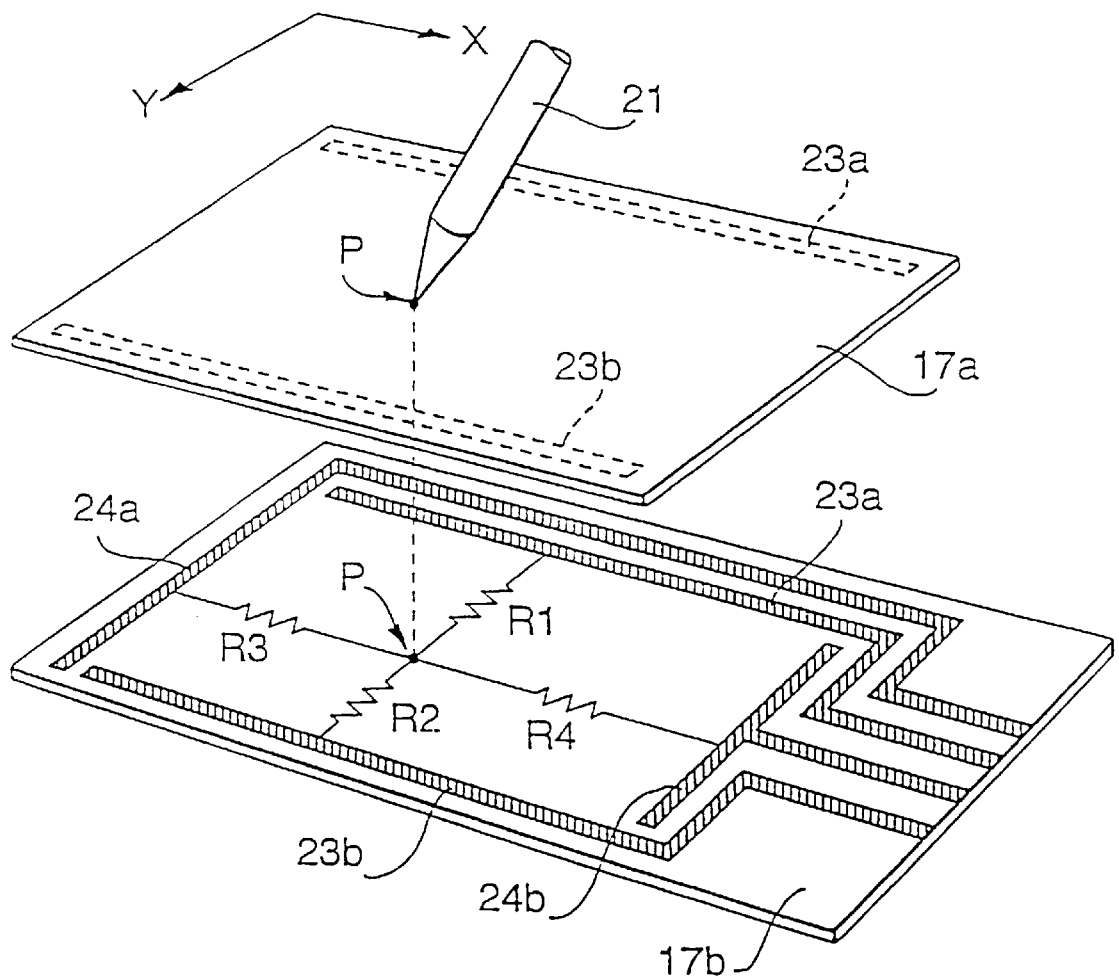
FIG. 3 is a perspective view illustrating a primary part of one illustration of the input device in an exploded manner.

As illustrated in FIG. 3, two electrode terminals 23a,23b extending in X-direction orthogonal to Y-direction are formed on an edge part in Y-direction of the first plastic film 17a. Two-electrode terminals 24a,24b extending in Y-direction are formed on the second plastic film 17b opposite thereto. As illustrated in FIG. 1, the electrode terminals 23a,23b,24a,24b are conductive-connected to a position detection circuit 26.

It is now assumed that the position of the point P on the first plastic film 17a is specified by the pen 21. Then, the first plastic film 17a is brought into point contact with the second plastic film 17b at the point P. Because the resistance value R1 between the electrode terminal 23a and the specified point P, and the resistance value R2 between the specified point P and the electrode terminal 23b are uniquely determined corresponding to the coordinate position of the specified position P, the electric potential $V_Y$ in Y-direction of the point P is uniquely determined if the prescribed voltage is applied between the electrodes 23a and 23b in accordance with the instruction from the position detection circuit 26. Similarly, because the resistance value R3 between the electrode terminal 24a and the specified point P, and the resistance value R4 between the specified point P and the electrode terminal 24b are also uniquely determined corresponding to the coordinate position of the specified position P, the electric potential $V_X$ in X-direction of the point P is determined if the prescribed voltage is applied between the electrodes 24a and 24b in accordance with the instruction from the position detection circuit 26. The specified point P can thus be prescribed by the electric potential ($V_X$, $V_Y$) viewed in two directions of X-Y.

The coordinate electric potential ($V_X$,$V_Y$) of the specified point P is received by the position detection circuit 26 in the time series manner, and transmitted to a CPU 27 (Central Processing Unit) to perform the whole control of the liquid crystal display device 1 from the position detection circuit 26. The CPU 27 performs the prescribed operation based on a program stored in a ROM 28 (Read Only Memory) using the prescribed area in a RAM 29 (Random Access Memory) as a working area, etc. The operation includes the operation to drive an LCD drive circuit 31. An output terminal of the LCD drive circuit 31 is conductive-connected to an external connection terminal 12 on the transparent substrate 8b of the liquid crystal display device 2, and the IC 14 for driving the liquid crystal is driven and operated by the LCD drive circuit 31, either of a plurality of transparent electrodes 9a,9b is selected, and the voltage is applied thereto, and as a result, the visible information such as characters, numerals and patterns is displayed on the side of the polarizer 16a.

In the liquid crystal display device 1 of the present embodiment, the transparent elastic member 4 is arranged between the liquid crystal display device 2 and the film-film input device 3. As a result, concentration of the stress to be applied to the plastic films 17a,17b on both face and back sides in a small area can be avoided when the first plastic film 17a is pressed by the pen 21, and degradation of the plastic films 17a,17b in a short time can be prevented. That means, the descriptive durability is improved.

When the first plastic film 17a is pressed by the pen 21, the transparent elastic member 4 is elastically deformed according thereto, and soft and favorable touch can be obtained compared with the case in which a hard member such as glass is pressed by the pen, etc. That means, the input touch is improved.

When the input device of the present invention described in (1) above is compared with the input device illustrated in FIG. 1, it is the essential requirement for the film-film type input device 3 illustrated in FIG. 1 to use a pair of the plastic films 17a,17b, and an arbitrary constitution can be adopted for other constitution. A visible information display means in which the input device 3 provided with the transparent elastic member is installed is not limited to the liquid crystal display device 2, but can also be installed e.g., on the CRT display, etc.

When the liquid crystal display device of the present invention described in (5) above is compared with the liquid crystal display device illustrated in FIG. 1, the liquid crystal display means is not limited to the liquid crystal display device 2 of COG type illustrated in FIG. 1, but any other liquid crystal display device of arbitrary type can also be used. In FIG. 1, the liquid crystal display device using the glass transparent substrate is adopted, but the liquid crystal display device using the plastic transparent substrate can be adopted in place thereof.

(B) First Embodiment of the Electronic Equipment Described in (9) Above

Figure 4:
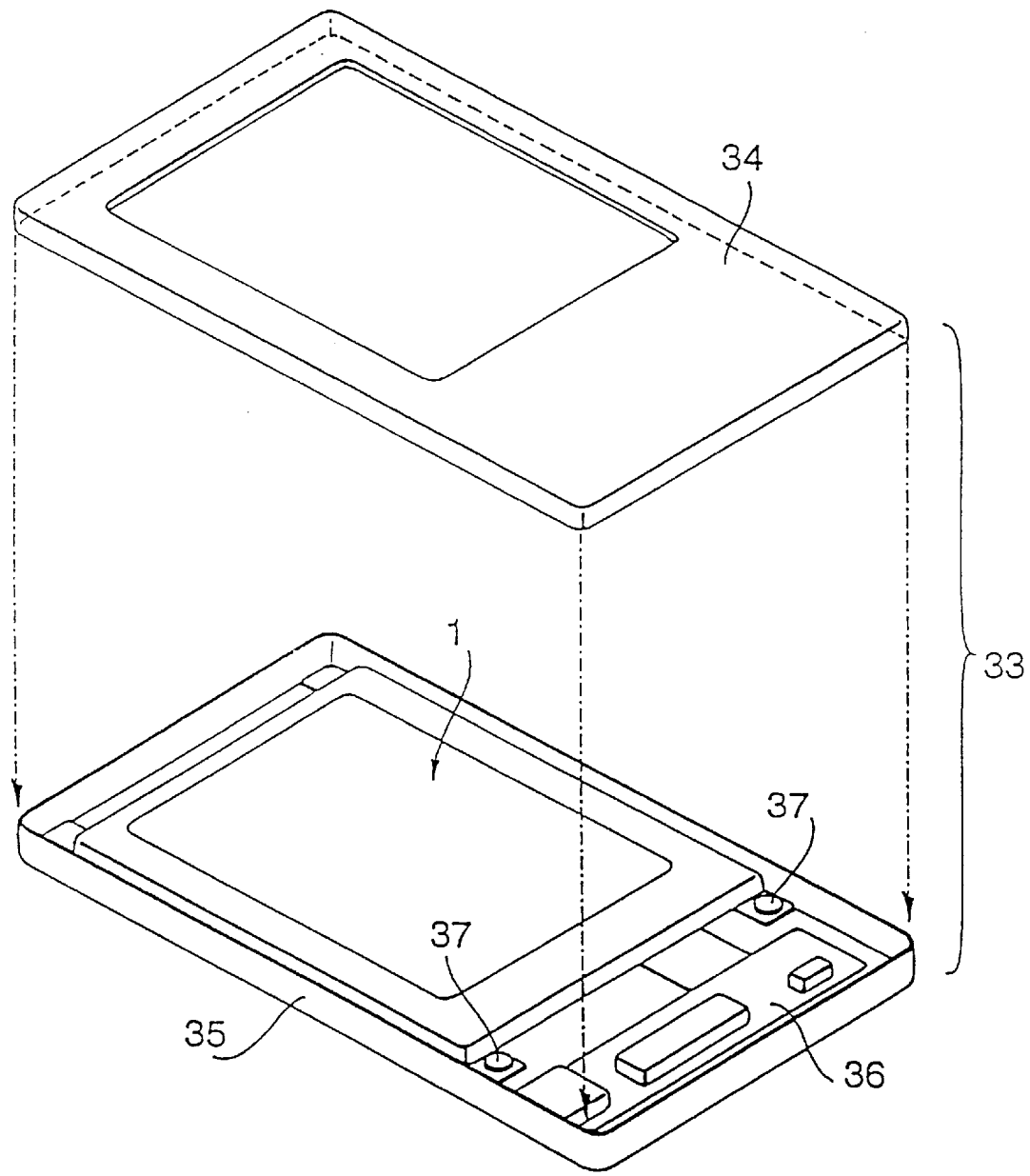
FIG. 4 is a perspective view illustrating one embodiment of an electronic device of the present invention in an exploded manner.

FIG. 4 illustrates a pen-input type portable information device which is an embodiment of the electronic device of the present invention. The pen-input type portable information device 33 is provided with an upper box body 34 and a lower box body 35. The liquid crystal display device 1 is fixed to the lower box body 35 by screws 37. The liquid crystal display device 1 illustrated in FIG. 1 can be applied as the liquid crystal display device 1. The liquid crystal display device 1 is conductive-connected to a control circuit substrate 36 in which a microprocessor, LSI, RAM, ROM, etc. for control are mounted. The upper box body 34 is fitted to the lower box body 35 in which the above-mentioned element devices are stored, and the pen-input type portable information device 33 is constituted by fixing the upper and lower box bodies to each other using screws and other tightening tools.

In the pen-input type portable information device 33, the visible information displayed on the liquid crystal display device 2 and various information based on the coordinate position specified through the film-film type input device 3 can be inputted as illustrated in FIG. 1. Various information can be displayed on the liquid crystal display device 2 in response to the inputted information.

When the electronic device of the present invention described in (9) above is compared with the electronic device illustrated in FIG. 4, the electronic device to which the present invention is applicable is not limited to the pen-input type portable information device, but can be applied to any devices in which both the input of the information and the display of the information are necessary such as a microcomputer, an electronic notebook, etc.

Figure 6:
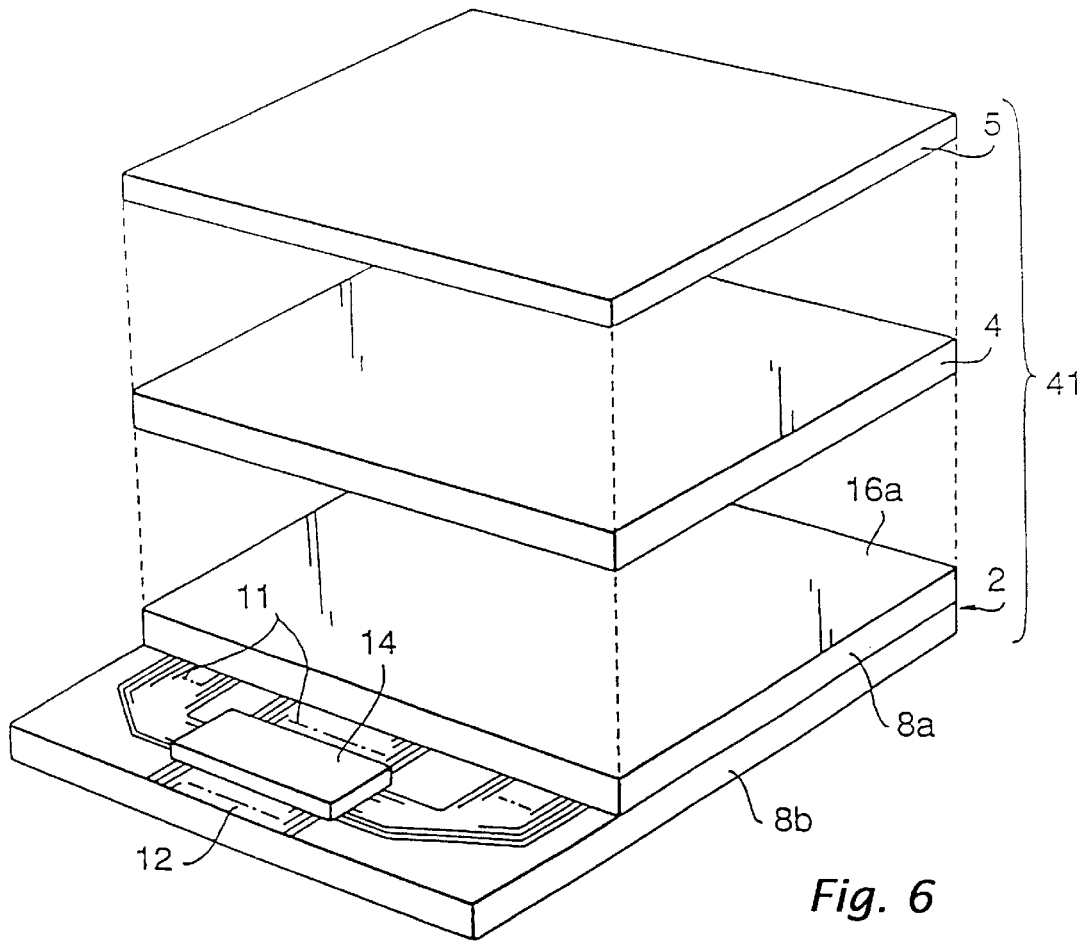
FIG. 6 is a perspective view illustrating the liquid crystal display device in FIG. 5 in an exploded manner.

(C) First Embodiment of the Liquid Crystal Display Device Described in (10) Above FIG. 6 illustrates an embodiment of the liquid crystal display device of the present invention. A liquid crystal display device 41 is provided with the liquid crystal display device 2, a protective plate 5 as the transparent covering member, and the transparent elastic member 4 to be arranged therebetween. The main object of the protective plate 5 is to prevent pollution or damages on a surface of the liquid crystal display device 2, and formed of, e.g., an acrylic plate of approximately 1 mm in thickness. The above-mentioned transparent elastic member 4 is formed of, e.g., silicone rubber and acrylic rubber to the thickness of not less than 0.5 mm to less than 2 mm.

Concerning the method to arrange a silicone rubber as the transparent elastic member between the liquid crystal display device 2 and the protective plate 5, a method can be adopted in which two kinds of liquid materials are mixed in an appropriate place in advance to form the silicone rubber, and the silicone rubber is placed on either of the surface of the liquid crystal display device 2 or the protective plate 5, and then, another device is stacked on the silicone rubber. In this case, the silicone rubber 4 may be adhered to the liquid crystal display device 2, and the silicone rubber 4 may be adhered to the protective plate 5 using the appropriate adhesive, or the space between the silicone rubber and the liquid crystal display device, and the space between the silicone rubber and the protective plate may be in the adhesive condition only with the adhesivity of the silicone rubber itself.

Figure 5:
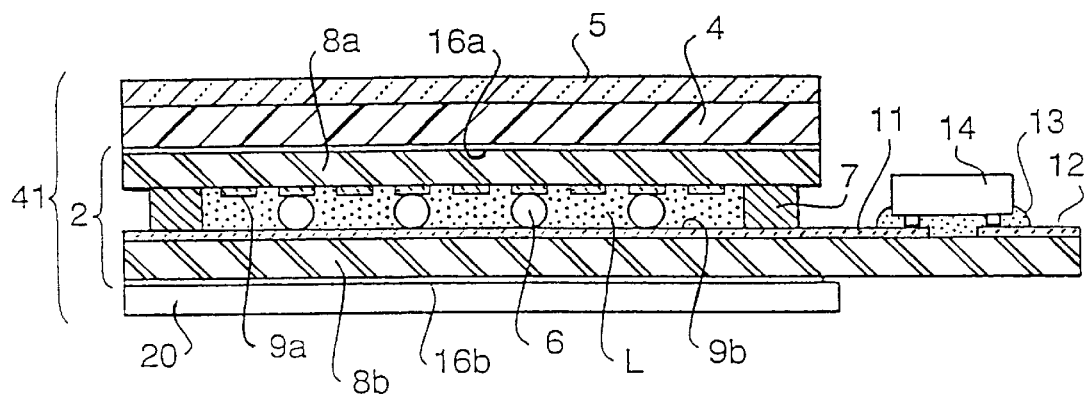
FIG. 5 is a sectional view illustrating another embodiment of the liquid crystal display device of the present invention.

The liquid crystal display device 2 is provided with a pair of flexible transparent substrates 8a,8b which are bonded with each other by the sealant 7 across the spacer 6, and the liquid crystal L sealed in the cell gap formed between the substrates as illustrated in FIG. 5. In the present embodiment, the transparent substrates 8a,8b are flexible, which is different from the transparent substrates 8a,8b illustrated in FIG. 1.

The first transparent electrode 9a of ITO is formed on an inner surface of the first flexible transparent substrate 8a, and the second transparent electrode 9b is formed on the inner surface of the second flexible transparent substrate 8b. The polarizer 16a is adhered to the outer surface of the first transparent substrate 8a, and the polarizer 16b is adhered to the outer surface of the second transparent substrate 8b. The polarization axes of the polarizers are opposite to each other with the prescribed angle to obtain the polarizing transmittance necessary for displaying the visible information. The back light unit 20 is arranged on the further outer side of the polarizer 16b.

The flexible transparent substrates 8a,8b are formed by laminating a gas barrier layer mainly consisting of the plastic film of, e.g., polycarbonate (PC), polyacrylate (PAr) or polyether sulfone (PES), and ethylene vinyl alcohol (EVA) and other material on both face and back sides of the gas barrier layer as necessary, and a surface layer formed of epoxy resin, etc.

The first transparent electrode 9a and the second transparent electrode 9b are connected to the electrode terminal 11 formed on the extension part of the second flexible transparent substrate 8b. The terminal 12 for external connection is formed on an edge part of the extension part of the second transparent substrate 8b. A bump for output and a bump for input of the IC 14 for drive the liquid crystal by the ACF 13 are conductive-connected respectively to the terminals 11,12. That means, the liquid crystal panel of the type in which the IC 14 for driving the liquid crystal is directly bonded on the transparent substrate of the liquid crystal panel, i.e., of COG (Chip On Glass) type is used in the present embodiment.

The transparent elastic member 4 is loaded on the surface of the polarizer 16a on the first flexible transparent substrate 8a, and the protective plate 5 is loaded on the transparent elastic member 4. The protective plate 5 is preferably lower in elasticity than the transparent elastic member 4, i.e., preferably set to be hard and difficult in elastic deformation. That means, the Young's modulus of the protective plate 5 is preferably set to be larger than the Young's modulus of the transparent elastic member 4. If the protective plate 5 is too soft, the liquid crystal display device 1 is difficult to handle.

The liquid crystal display device 2 of the present embodiment is constituted as the so-called plastic liquid crystal display device in which the transparent substrates 8a,8b are formed of the plastic film. Though the plastic liquid crystal display device has various advantages such as difficulty to crack, thin construction, light weight, and formability in various shapes compared with the liquid crystal display device using a glass transparent substrate, the plastic film tends to be deformed locally, i.e., in a narrow range compared with glass, and as a result, problems that irregular color of the displayed image and bubbles, etc. in the liquid crystal are likely to generate are presented. In particular, when bubbles are generated in the liquid crystal, the part is displayed as a dark spot, and practical application of the liquid crystal display device becomes impossible.

On the contrary, in the liquid crystal display device 41 of the present embodiment, the lamination structure of the transparent elastic member 4 and the protective plate 5 is loaded on the surface of the plastic liquid crystal display device which is easy to locally deform, the external force is absorbed by the transparent elastic member 4 and is not transmitted to the first flexible transparent substrate 8a of the liquid crystal display device 2 even when the external force is applied to the protective plate 5, and no local deformation is generated in the liquid crystal display device 2. As a result, the durability of the plastic liquid crystal display device can be remarkably improved.

When the liquid crystal display device of the present invention described in (10) above is compared with the embodiment in FIG. 5, the liquid crystal display device 2 can be the liquid crystal display device of arbitrary structure other than the liquid crystal display device of COG type illustrated in FIG. 5. The liquid crystal display device of the type in which a reflecting plate is used in place of the back light 20 can be used of course.

(D) Second Embodiment of Liquid Crystal Display Device Described in (10) Above

Figure 2:
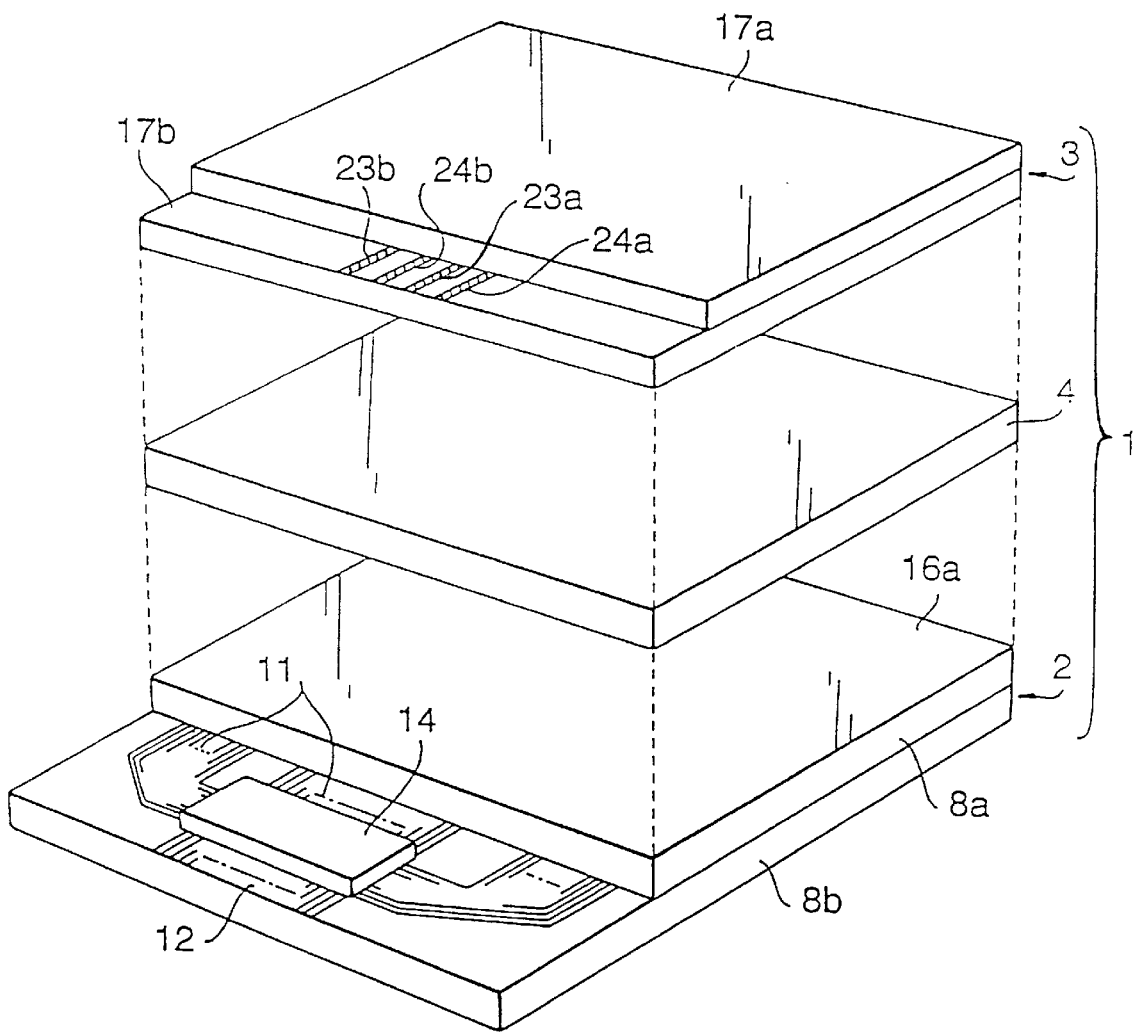
FIG. 2 is a perspective view illustrating the liquid crystal display device in FIG. 1 in an exploded manner.

FIG. 1 and FIG. 2 which are already explained, also illustrate a second embodiment of the liquid crystal display device of the present invention described in (10) above. The liquid crystal display device 1 of the present embodiment is same as the previous embodiment illustrated in FIG. 5 and FIG. 6 in that the transparent elastic member 4 is loaded on the liquid crystal display device 2, and different from the embodiment illustrated in FIG. 5 and FIG. 6 in that the input device 3 is loaded in place of the protective plate 5 (FIG. 5).

The input device 3 takes effect in preventing pollution or damages on the surface of the liquid crystal display device similar to the protective plate 5 (refer to FIG. 5), and also takes effect in inputting the positional information. The constitution of the input device 3 itself and the action of the control system including the CPU 27, etc., are already explained, and omitted here.

In the liquid crystal display device 1 of the present embodiment, when the film-film type input device 3 is pressed by the pen 21 with the pointed tip, the plastic films 17a,17b are locally deformed. Thus, when the film-film type input device 3 is directly loaded on the liquid crystal display device 2, the local external force is applied to the transparent substrates 8a,8b of the liquid crystal display device 2 in response to the local deformation.

When the transparent substrates 8a,8b are constituted as the flexible transparent substrates by using the plastic film like in the present embodiment, and when the local external force is applied to the transparent substrates 8a,8b, the transparent substrates 8a,8b are locally deformed, and irregular color or bubbles are easy to generate.

However, in the present embodiment where the transparent elastic member 4 is arranged between the liquid crystal display device 2 and the film-film type input device 3, even when the film-film type input device 3 is locally deformed by being pressed by the pen 21, the deformation is absorbed by the transparent elastic member 4, and is not transmitted to the plastic liquid crystal display device 2, and the local deformation of the flexible transparent substrates 8a,8b can surely be prevented, and generation of irregular color and bubbles can surely be prevented.

When the liquid crystal display device 1 illustrated in FIG. 1 is considered as the embodiment related to the liquid crystal display device of the present invention described in (10) above, the so-called film-glass type input device of the type in which a glass transparent substrate is used as the substrate corresponding to the flexible transparent substrate 17b to be stacked on the transparent elastic member 4 can be used in place of the film-film type input device 3.

(E) Third Embodiment of Liquid Crystal Display Device Described in (10) Above

Figure 7:
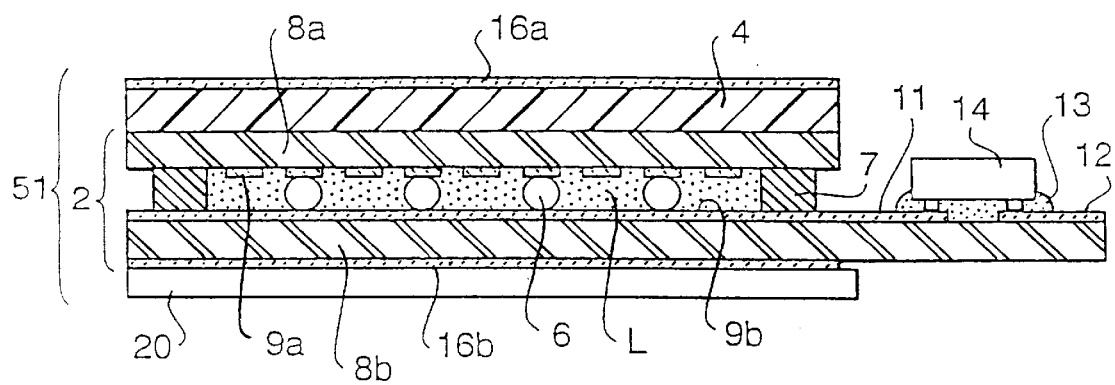
FIG. 7 is a sectional view illustrating still another embodiment of the liquid crystal display device of the present invention.

FIG. 7 illustrates the third embodiment of the liquid crystal display device of the present invention described in (10) above. The difference of a liquid crystal display device 51 illustrated here from the liquid crystal display device 41 illustrated in FIG. 5 is that the polarizer 16a is not directly arranged on the outer surface of the first flexible transparent substrate 8a of the liquid crystal display device 2, but the transparent elastic member 4 is directly arranged, and the polarizer 16a is arranged on the outer surface of the transparent elastic member 4. That means, the polarizer 16a is used as the transparent covering member.

Figure 8:
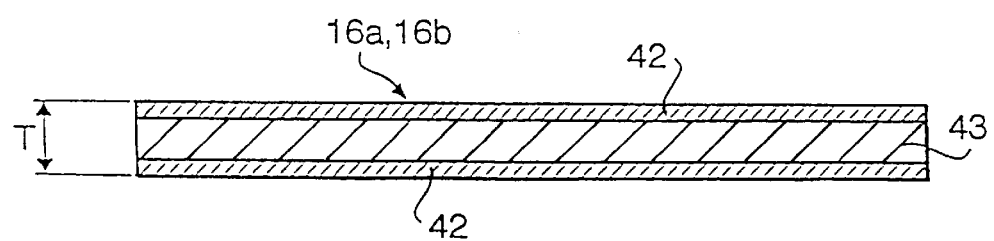
FIG. 8 is a sectional view illustrating a polarizer.

In the embodiment, the polarizer 16a is formed of a main body layer 43 formed of polyvinyl alcohol (PVA) in which iodine ($I_2$) is dissolved and mixed and surface layers 42 laminated on both face and back sides of the main body layer 43 as illustrated, for example, in FIG. 8. The surface layers 42 are, for example, formed of triacetyl cellulose (TAC). The polarizing transmittance characteristic to selectively transmit the polarized light under the prescribed condition is obtained by providing the polarizer 16a of such lamination structure. The thickness T of the polarizer 16a is set to be not less than 0.18 mm, preferably, not less than 0.2 mm. The polarizer 16a is thus set to be large because the polarizer 16a is also used as the protective plate to prevent damages or pollution on the surface of the liquid crystal display device 2.

In this embodiment, the polarizer to be surely used as the component of the liquid crystal display device is also used as the transparent covering member, any special transparent covering member can be dispensed with, the manufacturing man-hour can be reduced, and the cost of parts can be reduced.

(F) First Embodiment of Electronic Equipment Described in (18) Above

The pen-input type portable information device illustrated in FIG. 4 also illustrates one embodiment of the electronic device of the present invention described in (18) above. In the case of the embodiment, the liquid crystal display device 1 (FIG. 1), the liquid crystal display device 41 (FIG. 5), or the liquid crystal display device 51 (FIG. 7) is used as a visible image display part of the portable information device 33. The electronic device of the present invention described in (18) above is not limited to the pen-input type portable information device, but can be applied to arbitrary devices necessary for display of the visible information such as a compact computer, an electronic notebook, etc.

Industrial Applicability

The input device of the present invention is used for the input device for a computer, etc., and provided accompanying the liquid crystal display device, the CRT display, or other visible image display devices. The liquid crystal display device of the present invention is suitable to be used as the visible image display part for a portable computer terminal device, etc. The electronic device of the present invention is used as various electronic devices in which both display of the visible information such as numerals and characters, and input of various information such as numerals and characters are necessary.

What is claimed is:

1. A liquid crystal display device, comprising:
   a liquid crystal display having a pair of transparent substrates opposite to each other forming a cell gap therebetween and a liquid crystal sealed in the cell gap; and
   an input mechanism having a pair of plastic films stacked on each other with a clearance therebetween, one plastic film of which is pressed to display positional information and the other plastic film of which is stacked on said liquid crystal display and a polarizer former of a main body layer laminated on both sides by surface layers positioned between said liquid crystal display and said input mechanism, wherein a transparent elastic member is provided between said liquid crystal display and said other plastic film, said transparent elastic member having a thickness which is not less than 0.5 and not greater than 2 mm and a Young's modulus which is not less that $1 \times 10^4$ N/m$^2$ to less than $1 \times 10^8$ N/m$^2$.

2. The liquid crystal display device according to claim 1, wherein the transparent elastic member is made of silicone rubber.

3. An electronic device having the liquid crystal display device according to claim 1.

4. A liquid crystal display device having a pair of flexible transparent substrates opposite to each other forming a cell gap and a liquid crystal sealed in the cell gap, comprising:
   a transparent elastic member which is arranged on an outer side of one flexible transparent substrate and uniformly covers the flexible transparent substrate;
   a transparent covering member to uniformly cover the transparent elastic member; and
   a polarizer formed of a main body layer laminated on both sides by surface layers positioned between said transparent covering member and said one flexible transparent substrate, wherein the transparent covering member is an input device having a pair of transparent substrates stacked on each other with a clearance therebetween, and one of the transparent substrates is arranged on the other side of the transparent elastic member so as to uniformly cover said flexible transparent substrate and wherein the transparent covering member is lower in elasticity than the transparent elastic member.

5. The liquid crystal display device according to claim 4, wherein the transparent covering member is a protective plate to protect the flexible transparent substrate.

6. The liquid crystal display device according to claim 4, wherein the transparent elastic member is arranged in contact with the outer side of the one flexible transparent substrate, and the transparent covering member is arranged on an outer side of the transparent elastic member.

7. The liquid crystal display device according to claim 4, wherein the Young's modulus of the transparent elastic member is not less that $1\times10^4$ N/m$^2$ to less than $1\times10^8$ N/m$^2$ and the thickness of the transparent elastic member is not less than 0.5 mm to less than 2 mm.

8. An electronic device having the liquid crystal display device according to claim 4.

9. A display device comprising:

a liquid crystal panel:

an elastic layer disposed on a display area of said visible information display, said elastic layer being substantially transparent:

an input device disposed on said elastic layer, said input device having a first plastic film and a second plastic film disposed on said first plastic film with a gap formed between said first and second plastic film; and a polarizer formed of a main body layer laminated on both sides by surface layers positioned between said liquid crystal panel and said device, wherein the Young's modules of said elastic member is not less than $1\times10^4$ N/m$^2$ to less than $1\times10^8$ N/m$^2$ and the thickness of the elastic member is not less that 0.5 mm to less than 2 mm.

10. A display device according to claim 9 wherein said polarizer is positioned between said liquid crystal panel and said elastic layer.

11. A display device comprising:

a liquid crystal panel;

an elastic layer disposed on a display area of said visible information display, said elastic layer being substantially transparent;

an input device disposed on said elastic layer, said input device having a first plastic film and a second plastic film disposed on said first plastic film with a gap formed between said first and second plastic films; and a polarizer formed of a main body layer laminated on both sides by surface layers positioned between said liquid crystal panel and said input device, wherein said elastic layer is made of a material selected from a group consisting of a silicone rubber, an acrylic rubber and a natural rubber, wherein the thickness of the elastic layer is not less than 0.5 mm to less than 2 mm.

12. A display device according to claim 11 wherein said polarizer is positioned between said liquid crystal panel and said elastic layer.

13. A display device comprising:

a liquid crystal panel having a pair of flexible substrates and liquid crystal sandwiched therebetween;

an elastic layer disposed on a display area of said liquid crystal panel, said elastic layer being sufficiently transparent;

an input device disposed on said elastic layer; and a polarizer formed of a main body layer laminated on both sides by surface layers positioned between said liquid crystal panel and said input device;

wherein said input device has higher Young's modules than that of said elastic member and includes a first plastic film and a second plastic film disposed on said first plastic film with a gap formed between said first and second films;

wherein said elastic layer is made of a material selected from a group consisting of a silicone rubber, an acrylic rubber and a natural rubber; and wherein the thickness of the elastic member is between 0.5 mm and 2 mm.

14. A display device according to claim 13, wherein said cover member further comprises a polarizer.

* * * * *

UNITED STATES PATENT AND TRADEMARK OFFICE
CERTIFICATE OF CORRECTION

PATENT NO. : 6,369,865 B2
DATED : April 9, 2002
INVENTOR(S) : Shoji Hinata

It is certified that error appears in the above-identified patent and that said Letters Patent is hereby corrected as shown below:

Column 3,
Line 45, please delete first occurrence of "of"

Column 9,
Line 67, "drive" should be -- driving --

Column 12,
Line 37, "former" should be -- formed --
Line 43, "0.5" should be -- 0.55mm --

Column 13,
Line 18, "panel:" should be -- panel; --
Line 21, "transparent:" should be -- transparent; --
Line 29, after "said" insert -- input --

Signed and Sealed this

First Day of October, 2002

*Attest:*

*Attesting Officer*

JAMES E. ROGAN
*Director of the United States Patent and Trademark Office*